(12) United States Patent
Raszewski

(10) Patent No.: US 11,795,305 B2
(45) Date of Patent: Oct. 24, 2023

(54) PACKAGING FILMS

(71) Applicant: DisSolves, Inc., Pleasant Hills, PA (US)

(72) Inventor: Jared Richard Raszewski, Pleasant Hills, PA (US)

(73) Assignee: DISSOLVES, INC., Pleasant Hills, PA (US)

( * ) Notice: Subject to any disclaimer, the term of this patent is extended or adjusted under 35 U.S.C. 154(b) by 0 days.

(21) Appl. No.: 16/392,704

(22) Filed: Apr. 24, 2019

(65) Prior Publication Data

US 2019/0248989 A1 Aug. 15, 2019

Related U.S. Application Data

(60) Provisional application No. 62/749,412, filed on Oct. 23, 2018, provisional application No. 62/611,845, filed on Dec. 29, 2017.

(51) Int. Cl.

| | |
|---|---|
| *C08L 5/04* | (2006.01) |
| *C08L 5/08* | (2006.01) |
| *C08L 67/04* | (2006.01) |
| *C08K 5/053* | (2006.01) |
| *C08L 3/02* | (2006.01) |
| *C08L 5/06* | (2006.01) |
| *B65D 65/46* | (2006.01) |
| *C08K 5/098* | (2006.01) |
| *C08J 5/18* | (2006.01) |

(52) U.S. Cl.
CPC .............. *C08L 5/04* (2013.01); *B65D 65/466* (2013.01); *C08J 5/18* (2013.01); *C08K 5/053* (2013.01); *C08K 5/098* (2013.01); *C08L 3/02* (2013.01); *C08L 5/06* (2013.01); *C08L 5/08* (2013.01); *C08L 67/04* (2013.01); *C08L 2201/06* (2013.01); *C08L 2203/16* (2013.01)

(58) Field of Classification Search
None
See application file for complete search history.

(56) References Cited

U.S. PATENT DOCUMENTS

| | | | |
|---|---|---|---|
| 5,654,103 A | 8/1997 | Troadec | |
| 5,919,574 A | 6/1999 | Hoagland | |
| 2006/0275529 A1* | 12/2006 | Woodhouse | A21C 9/04 426/89 |
| 2010/0196543 A1* | 8/2010 | Rivera | A23L 2/56 426/74 |
| 2010/0240724 A1 | 9/2010 | Chang et al. | |
| 2011/0229698 A1* | 9/2011 | Rasmussen | C08L 91/06 428/195.1 |
| 2013/0323390 A1 | 12/2013 | Kawamura et al. | |
| 2014/0356603 A1* | 12/2014 | Kumar | B32B 1/02 428/216 |
| 2020/0214484 A1* | 7/2020 | Briganti | A23G 3/50 |

FOREIGN PATENT DOCUMENTS

| | | |
|---|---|---|
| RU | 2458077 | 8/2012 |
| RU | 2604223 | 12/2016 |
| WO | WO 2019/046789 | 3/2019 |

OTHER PUBLICATIONS

International Search Report and Written Opinion dated Sep. 24, 2020 for International Application No. PCT/US2020/039356, 8 pages.

Indian First Examination Report dated Jul. 19, 2022 for Application No. 202027046273, 8 pages.

Extended European Search Report dated Dec. 7, 2022 for European Application No. 20789810.7, 6 pages.

\* cited by examiner

*Primary Examiner* — Robert T Butcher

(74) *Attorney, Agent, or Firm* — FisherBroyles, LLP

(57) ABSTRACT

Films and packaging materials including biodegradable and edible components and pods created using these materials are described herein.

13 Claims, No Drawings

PACKAGING FILMS

CROSS-REFERENCE TO RELATED APPLICATIONS

This application claims priority from U.S. Provisional No. 62/661,845 filed Apr. 24, 2018, entitled "Beverage Mix Pods and Process for Making Same," and U.S. Provisional No. 62/749,412 filed Oct. 23, 2018, entitled "Packaging Films" each of which are hereby incorporated by reference in their entireties.

GOVERNMENT INTERESTS

Not applicable

PARTIES TO A JOINT RESEARCH AGREEMENT

Not applicable

INCORPORATION OF MATERIAL ON COMPACT DISC

Not applicable

BACKGROUND

Not applicable

SUMMARY OF THE INVENTION

Various embodiments are directed to compositions including a biodegradable polymer and polyhydric alcohol, polyhydric acid, or combinations thereof. In some embodiments, the ratio of biodegradable polymer to polyhydric alcohol, polyhydric acid, or combinations thereof may be about 0.5:1 to about 1:10. In certain embodiments, the composition may include about 20 wt. % to about 60 wt. % alginate or alginate salt and about 8 wt. % to about 25 wt. % glycerol.

In some embodiments, the composition may include about 20 wt. % to about 50 wt. % biodegradable polymer, and in various embodiments, the biodegradable polymer may be any of polylactic acid (polylactide), chitin, chitosan, alginic acid, alginate salt, such as, sodium alginate, calcium alginate, magnesium alginate, triethanolamine alginate, potassium alginate, strontium alginate, barium alginate, or ammonium alginate, propylene glycol alginate, lignin, thermoplastic starch, polyethylene, polypropylene, polyethylene glycol, polyglycolide, poly (lactide-co-glycolide), polyacrylate, polymethacrylate, poly (8-caprolactone), polyorthoester, polyanhydride, polylysine, polyethyleneimine, carboxymethylcellulose, acetylated carboxymethylcellulose, gelatin, collagen, pullulan, cold-soluble gelatin, pectin, locust gum derivatives, hydrocolloids, kappa carrageenan, lambda carrageenan, iota carrageenan, and derivatives, combinations, and copolymers thereof. In particular embodiments, the biodegradable polymer may be alginate or alginate salt or combinations of alginate and alginate salts, and in certain embodiments, the biodegradable polymer may be sodium alginate, calcium alginate, magnesium alginate, potassium alginate, or combinations or mixtures thereof.

In some embodiments, the composition may include about 5 wt. % to about 40 wt. % polyhydric alcohol, and in various embodiments, the polyhydric alcohol may be glycerol, sorbitol, mannitol, galactitol, arabitol, erythritol, xylitol, and combinations or mixtures thereof. In certain embodiments, the polyhydric alcohol may be any combination of glycerol, xylitol, or erythritol.

In some embodiments, the composition may include about 4 wt. % to about 10 wt. % emulsifier, surfactant, or combination thereof, and in various embodiments, the emulsifier or surfactant is selected from the group consisting of lecithin, sunflower lecithin, soy lecithin, monoglycerides, diglycerides, gums, guar gum, Arabic gum, locust bean gum, polysorbates, polysorbate-80, sucrose esters, and combinations thereof.

In some embodiments, the composition may include about 5 wt. % to about 20 wt. % chelating agent, builder, or combination thereof, and in various embodiments, the chelating agents and builders may be sodium citrate, monosodium citrate, disodium citrate, trisodium citrate, sodium triphosphate (STPP), sodium hexametaphosphate, sodium phosphate, disodium phosphate, trisodium phosphate, and combinations thereof.

In some embodiments, the composition may include about 4 wt. % to about 10 wt. % hydrotrope, and in various embodiments, the hydrotrope may be amino acids, proline, histidine, isoleucine, leucine, lysine, methionine, phenylalanine, threonine, tryptophan, valine, nucleic acids, adenosine triphosphate (ATP) and combinations thereof.

In some embodiments, the composition may include about 15 wt. % to about 45 wt. % bulking agent, and in various embodiments, the bulking agent may be maltodextrin, tapioca starch, potato starch, corn starch, cellulose, pectins, glucans, mucilages, inulin, chitin, and combinations thereof.

Additional embodiments are directed to a film containing a biodegradable polymer and polyhydric alcohol, polyhydric acid, or combinations thereof. In some embodiments, the ratio of biodegradable polymer to polyhydric alcohol, polyhydric acid, or combinations thereof may be about 0.5:1 to about 1:10. In certain embodiments, the composition may include about 20 wt. % to about 60 wt. % alginate or alginate salt and about 8 wt. % to about 25 wt. % glycerol. In further embodiments, the film may include any of the components described in relation to the compositions above.

Further embodiments are directed to devices including a film containing a biodegradable polymer and polyhydric alcohol, polyhydric acid, or combinations thereof; and a foodstuff sealed within the film. In some embodiments, the foodstuff may be beverages, nutritional supplements, desserts, powdered food mixtures, and combinations thereof, and in some embodiments, the foodstuff may be a powdered nutritional formulation, powdered protein supplement, powdered milk, powdered baby food, powdered infant formula, and combinations thereof.

DESCRIPTION OF THE DRAWINGS

Not applicable

DETAILED DESCRIPTION

Various aspects now will be described more fully hereinafter. Such aspects may, however, be embodied in many different forms and should not be construed as limited to the embodiments set forth herein; rather, these embodiments are provided so that this disclosure will be thorough and complete, and will fully convey its scope to those skilled in the art.

Where a range of values is provided, it is intended that each intervening value between the upper and lower limit of that range and any other stated or intervening value in that stated range is encompassed within the disclosure. For example, if a range of 1 ml to 8 ml is stated, 2 ml, 3 ml, 4 ml, 5 ml, 6 ml, and 7 ml are also intended to be explicitly disclosed, as well as the range of values greater than or equal to 1 ml and the range of values less than or equal to 8 ml.

All percentages, parts and ratios are based upon the total, dry weight of the compositions and films and all measurements made are at about 25° C, unless otherwise specified.

The singular forms "a," "an," and "the" include plural referents unless the context clearly dictates otherwise. Thus, for example, reference to a "polymer" includes a single polymer as well as two or more of the same or different polymers; reference to an "excipient" includes a single excipient as well as two or more of the same or different excipients, and the like.

The word "about" when immediately preceding a numerical value means a range of plus or minus 10% of that value, e.g., "about 50" means 45 to 55, "about 25,000" means 22,500 to 27,500, etc., unless the context of the disclosure indicates otherwise, or is inconsistent with such an interpretation. For example, in a list of numerical values such as "about 49, about 50, about 55, "about 50" means a range extending to less than half the interval(s) between the preceding and subsequent values, e.g., more than 49.5 to less than 52.5. Furthermore, the phrases "less than about" a value or "greater than about" a value should be understood in view of the definition of the term "about" provided herein.

By hereby reserving the right to proviso out or exclude any individual members of any such group, including any sub-ranges or combinations of sub-ranges within the group, that can be claimed according to a range or in any similar manner, less than the full measure of this disclosure can be claimed for any reason. Further, by hereby reserving the right to proviso out or exclude any individual substituents, analogs, compounds, ligands, structures, or groups thereof, or any members of a claimed group, less than the full measure of this disclosure can be claimed for any reason. Throughout this disclosure, various patents, patent applications and publications are referenced. The disclosures of these patents, patent applications and publications in their entireties are incorporated into this disclosure by reference in order to more fully describe the state of the art as known to those skilled therein as of the date of this disclosure. This disclosure will govern in the instance that there is any inconsistency between the patents, patent applications and publications cited and this disclosure.

For convenience, certain terms employed in the specification, examples and claims are collected here. Unless defined otherwise, all technical and scientific terms used in this disclosure have the same meanings as commonly understood by one of ordinary skill in the art to which this disclosure belongs.

Various embodiments of the invention are directed to compositions and films composed of biodegradable compounds, articles including the compositions and films of embodiments and foodstuffs, methods for making such compositions and films, and methods for using the compositions and films for packaging foodstuffs.

The compositions and films of embodiments may be primarily composed of a biodegradable polymers and polyhydric alcohol, polyhydric acid, or combinations thereof. In some embodiments, the compositions and films may be substantially all biodegradable polymer and polyhydric alcohol with other components that do not substantially add to the mechanical properties, for example, tensile strength, elongation, elasticity, and the like, but may add to the physical properties of the film, for example, permeability, solubility, hydrophobicity, and the like. The compositions and films may include any concentration of biodegradable polymer necessary to produce a composition or film having sufficient mechanical properties for its intended use. For example, in some embodiments, compositions and films may include up to 99 wt. % biodegradable, about 50 wt. % to about 99 wt. % biodegradable polymer, about 60 wt. % to about 95 wt. % biodegradable polymer, about 70 wt. % to about 90 wt. % biodegradable polymer, about 75 wt. % to about 85 wt. % biodegradable polymer or any individual concentration or range encompassed by these example ranges.

The compositions and films of such embodiments may include 25 wt. % or less polyhydric alcohol, about 5 wt. % to about 30 wt. % polyhydric alcohol, about 8 wt. % to about 25 wt. % polyhydric alcohol, polyhydric acid, or combinations thereof, about 10 wt. % to about 20 wt. % polyhydric alcohol, polyhydric acid, or combinations thereof, or any individual concentration or range encompassed by these example ranges. In certain embodiments, the compositions and films may include about 20 wt. % to about 50 wt. % biodegradable polymer and about 22 wt. % to about 40 wt. % polyhydric alcohol, polyhydric acid, or combinations thereof.

The biodegradable polymers of such embodiments include, but are not limited to, polylactic acid (polylactide), chitin, chitosan, alginic acid, alginate salts, such as, sodium alginate, calcium alginate, magnesium alginate, triethanolamine alginate, potassium alginate, strontium alginate, barium alginate, or ammonium alginate, propylene glycol alginate, lignin, thermoplastic starch, polyethylene, polypropylene, polyethylene glycol, polyglycolide, poly (lactide-co-glycolide), polyacrylate, polymethacrylate, poly (8-caprolactone), polyorthoester, polyanhydride, polylysine, polyethyleneimine, carboxymethylcellulose, acetylated carboxymethylcellulose, gelatin, collagen, pullulan, cold-soluble gelatin, pectin, locust gum derivatives, hydrocolloids, kappa carrageenan, lambda carrageenan, or iota carrageenan, and derivatives, combinations, and copolymers thereof. In some embodiments, the biodegradable polymer may be a natural substance, and in certain embodiments, the biodegradable polymer may be a food grade substance. In particular embodiments, the biodegradable polymer may be alginate or alginate salt or combinations of alginate and alginate salts, and in some embodiments, the biodegradable polymer may be sodium alginate, calcium alginate, magnesium alginate, potassium alginate, or combinations or mixtures thereof.

The polyhydric alcohol of such embodiments include, but are not limited to, glycerol, sorbitol, mannitol, galactitol, arabitol, erythritol, xylitol, and combinations or mixtures thereof. In some embodiments, the polyhydric alcohol may be a natural substance, and in certain embodiments, the polyhydric alcohol may be a food grade substance. In particular embodiments, the polyhydric alcohol may be glycerol. Polyhydric acids include, for example, alpha and beta hydroxy acids, lactic acid, such as sodium lactate, glycolic acid, citric acid, glyceric acid, and the like and combinations thereof.

In some embodiments, the ratio of polyhydric alcohol to biodegradable polymer may be about 0.5:1 to about 1:10, about 0.5:1 to about 1:7.5 about 0.5:1 to about 1:5, about 1:1 to about 1:10, about 1:1 to about 1:7.5, about 1:1 to about 1:5, and any ratio or range encompassed by these example ranges. In particular embodiments, the composition or film may include about 20 wt. % to about 60 wt. % alginate or alginate salt and about 8 wt. % to about 25 wt. % glycerol.

The compositions or films of various embodiments may include various additional components, and in some such embodiments, these additional components may not substantially add to the mechanical properties of the compositions or films. For example, the films of some embodiments have sufficient tensile strength and elongation that reinforcing fibers are not necessary to hold another substance such as a liquid or powder in a receptacle or pod composed of the film. The additional components may, however, modify the solubility, hydrophobicity, permeability, and the like of the film, improving its stability.

For example, in some embodiments, the compositions or film may include a bulking agent. The type of bulking agent is not limited and may include, for example, maltodextrin, tapioca starch, potato starch, corn starch, cellulose, pectins, glucans, mucilages, inulin, and chitin. In some embodiments, the bulking agent is tapioca starch and in certain embodiments, the bulking agent may be maltodextrin or combinations thereof.

The amount of bulking agent in the compositions and films may vary among embodiments. For example, in some embodiments, the amount of bulking agent may be up to 40 wt. % of the total composition or film, and in other embodiments, the amount of bulking agent may be from about 15 wt. % to about 45 wt. %, about 15 wt. % to about 40 wt. %, about 20 wt. % to about 35 wt. %, or any individual concentration or range encompassed by these example ranges.

The bulking agent may improve the volume of the compositions and films of embodiments. For example, in some embodiments, the compositions and films of the invention can be used as a dissolvable packaging material. However, in order to make a dissolvable packaging of sufficient size to be useful an excess of biodegradable polymer would need to be used. As a result, of excess biodegradable polymer, packaging becomes slower dissolving, which will be undesirable to the consumer. To avoid slow dissolution and provide a large enough size of packaging, a bulking agent can be added to increase the amount of packaging without contributing to the strength of the material. In the presence of bulking agents, a larger amount of packaging can be produced while maintaining appropriate dissolving characteristics.

In some embodiments, the composition or film may include a chelating agent. The type of chelating is not limited and may include, for example, citric acid, citric acid salts such as sodium citrate, monosodium citrate, disodium citrate, trisodium citrate, potassium citrate, citric acid esters such as triethyl citrate, disuccinic acid, gluconic acid, sodium gluconate, glucaric acid, sodium glucarate, tartaric acid, sodium tartrate, potassium tartrate, potassium sodium tartrate, sodium triphosphate (STPP), sodium hexametaphosphate, sodium phosphate, disodium phosphate, trisodium phosphate, organic phosphonates, nitrilotriacetic acid (NTA), proteins with high concentrations of aspartic and glutamic acid, polyaspartic acid, polyglutamic acid, hydrolyzed soy protein, phytic acid, sodium phayates, ethylenediamine tetraacetic acid (EDTA), ethylenediamine-N,N'-bis (2-hydroxyphenylacetic acid) (EDDHA), diethylenetriamine pentaacetate (DTPA), glucoheptonate, polyamines, such as polyamidoamine, polyethyleneamine, polyethyleneimine, polyethylenimine monoethanol ethylenediamine triacetic acid, diethanol ethylenediamine diacetic acid, diethylenatriamine pentacetic acid, monoethanol diethylenetriamine tetraacetic, N-hydroxyethyl diethylenetriamine tetraacetic, N'-hydroxyethyl diethylenetriamine tetraacetic, diethanol diethylenetriamine triacetic acid, N,N'-dihydroxyethyl diethylenetriamine triacetic acid, N',N"-dihydroxethyl diethylenetriamine triacetic acid, and compounds based upon propylene, isopropylene, methylethylene, cyclohexylene, and the like, and combinations thereof. In some embodiments, the chelating agent is sodium triphosphate or other salts of phosphate, diphosphates, and triphosphates, and in certain embodiments, the chelating agent may be citric acid, citric acid salts, citric acid esters, or combinations thereof.

The amount of chelating agent in the compositions and films may vary among embodiments. For example, in some embodiments, the amount of chelating agent may be up to 25 wt. % of the total composition or film, and in other embodiments, the amount of chelating agent may be from about 5 wt. % to about 30 wt. %, about 10 wt. % to about 25 wt. %, about 15 wt. % to about 22 wt. %, or any individual concentration or range encompassed by these example ranges.

The chelating agent may improve the solubility of the compositions and films of embodiments. For example, in some embodiments, the compositions and films of the invention can be used as a dissolvable packaging material. However, dissolvable packaging materials can leave remnants in dissolution solutions. These pieces of material are not desirable functionally or aesthetically by consumers. The amount of intake packaging can be directly correlated with the amount of ions in solutions because these ions can cause the packaging material to crosslink, rendering it insoluble. These undesirable ions can come from the packaged product itself or be present in the solution. For example, drinking water often contains calcium ions that can cause crosslinking of alginate and carrageenan films. To avoid crosslinking, chelating agents can be added to the solution to ensure all the packaging polymers in solutions exist in their soluble forms. In the presence of chelating agents dissolvable packaging may dissolve faster and to a greater extent than dissolvable packaging that does not include chelating agents.

In particular embodiments a composition or film may include about 75 wt. % to about 85 wt. % alginate or alginate salt and about 15 wt. % to about 25 wt. % glycerol may include about 10 wt. % citric acid salt such as sodium citrate. The reaction of alginate or alginate salts with a source of calcium ions forms calcium alginate. The sodium citrate may provide sodium ions to the solution to increase the concentration of sodium alginate (the soluble form), and the citrate ions may conjugate/chelate the calcium ions to pull them away from the alginate polymers. As a result, the packaging dissolves faster and to a greater extent.

In some embodiments, the chelating agent can be included in the composition or film itself. For example, the chelating agent may bind to, intercalate with, or integrate into the biodegradable polymer and polyhydric alcohol forming a continuous film or composition. Without wishing to be bound by theory, incorporation into the packaging itself has the advantage of maximizing the local concentration of the beneficial ions in solution. In other embodiments, the chelating agent may be held within packaging composed of the biodegradable polymer and polyhydric alcohol film or composition. For example, a serving of sodium citrate can be held within the packaging and then release once the packaging begins to breakdown in water.

In still other embodiments a chelating agent may be produced in situ by providing components of a chelating agents that react when the packaging is exposed to water. For example, sodium citrate can be produced by the reaction of sodium bicarbonate with citric acid. Thus, the biodegradable polymer and polyhydric alcohol film or composition may contain sodium bicarbonate and citric acid either intrinsically or within the packaging. The reaction of sodium bicarbonate with citric acid also produces carbon dioxide. When placed in solution, the citric acid will react with the sodium bicarbonate to produce carbon dioxide and sodium citrate. Sodium citrate can aid the dissolution of the film, and carbon dioxide gas will produce bubbles within the packaging, speeding the breakdown of the packaging and/or providing an effervescent solution.

In some embodiments, the compositions and films of the invention may further include emulsifiers, surfactants, hydrotropes, and the like and combinations thereof. Examples of emulsifiers and surfactants may include, without limitation, lecithin such as sunflower lecithin, soy lecithin, monoglycerides and diglycerides, gums such as guar gum, Arabic gum, locust bean gum, polysorbates such as polysorbate-80, sucrose esters, and the like and combinations thereof. Examples of hydrotropes include, without limitation, amino acids such as proline, histidine, isoleucine, leucine, lysine, methionine, phenylalanine, threonine, tryptophan, valine, and the like and combinations thereof, and nucleic acids such as adenosine triphosphate (ATP) and the like. The concentration of emulsifier, surfactant, and hydrotropes in the compositions and films of the invention may be about 4 wt. % to about 10 wt. %, about 4 wt. % to about 9 wt. %, about 4 wt. % to about 8 wt. %, or any individual concentration or range encompassed by these example ranges.

In some embodiments, the compositions and films of the invention may further include preservatives to increase the shelf-life of the composition or film and discourage the growth of pathogens or other microorganisms. Examples of preservatives include, without limitation, benzoates such as sodium benzoate, sorbates such as sodium sorbate, sorbic acid, and the like, essential oils, and sodium propionate. The concentration of preservative in the compositions and films of the invention may be about 0.1 wt. % to about 5 wt. %, about 0.2 wt. % to about 3 wt. %, about 0.5 wt. % to about 2 wt. %, or any individual concentration or range encompassed by these example ranges.

The films of various embodiments described above may have a thickness of about 0.5 mil and about 8 mil.

Further embodiments are directed to methods for making the compositions and films described above. For example, the methods of some embodiments may include the steps of components of the compositions and films in a solvent such as water or ethanol to form a casting composition, and casting a film from the casting composition.

In some embodiments, methods may include the step of combining the polyhydric alcohol and, in certain embodiments, chelating agents, emulsifiers, surfactants, hydrotropes, solubility aids, preservatives, and the like, in a casting base solvent to form a casting base, and separately combining the biodegradable polymer in a film base solvent to form a film base. Such methods may further include mixing the casting base and film base to from the casting composition and casting a film from the casting composition. In such embodiments, biodegradable polymer may not dissolve the film base solvent but rather may form a slurry with the biodegradable polymer. The film base solvent may be the same as the casting base solvent or the film base solvent may be different than the casting base solvent. In some embodiments, the biodegradable polymer may not dissolve in the film base solvent, but the biodegradable polymer may be soluble in the casting base solvent. This, the biodegradable polymer and the film base solvent may dissolve in the casting base solvent during mixing.

Examples of casting base solvents include ethanol, methanol, propanol, acetone, benzyl alcohol, 1,3-butylene glycol, carbon dioxide, isopropyl alcohol, methyl ethyl ketone, 1,2-propylene glycol, ethyl acetate, and the like and combinations thereof. Examples of film base solvents include water, ethanol, carbon dioxide, methanol, ethyl acetate, acetone, and the like and combinations thereof.

In particular embodiments, the methods may include the step of heating the casting base before the step of mixing the casting base and the film base. In such embodiments, the casting composition may be heated during mixing until the film base is completely dissolved In the casting base. In some embodiments, the methods may include mixing of the casting base and the film base under vacuum to avoid the production of bubbles.

Once the components of the film are fully incorporated into the casting composition, the casting composition may be cast to form the film. Casting may include the steps of extruding the casting composition onto a release medium. The release medium may be made of a non-stick material such as, for example, silicon, to facilitate the removal of the case film from the release medium. In various embodiments, the release film can be smooth or textured to impart different properties to the resulting film. In some embodiments, release medium may be a tray, and in still other embodiments, the release medium may be a slot die.

The methods of embodiments may further include curing the casting composition after the casting composition has been extruded onto the release medium to form the final product. Curing generally includes removing excess casting solvent from the casting composition to produce a solid or semi-solid film. Curing can be achieved through many different approaches. For example, in some embodiments, curing may include the steps of lowering pressure during curing and increasing temperature of the casting composition. In some embodiments, curing may include contacting the curing casting composition with air to facilitate mass transfer of solvent from the casting composition. In some embodiments, curing may include drying the casting composition at room temperature until it has dried sufficiently.

The films of embodiments may be smooth or textured, and in some embodiments, portions of the film may be smooth and another portion of the film may be textured. Texturing implies that the film is not smooth and encompasses textures introduced during manufacture either intentionally or unintentionally. For example, in some embodiments, the films may include a surface with ridges, valleys, or projections. In certain embodiments, the films may include sufficient projections to produce a lotus effect providing the hydrophobic barrier to reduce or delay dissolution when the film is contacted with water. In other embodiments, the textured surfaces may provide additional surface area improving adherence of the film to other film layer.

Methods may further include the steps of removing the film from the release medium or storing the film on the release medium.

Further embodiments are directed to packages composed of the films described above and methods for making such packages. The packages of various embodiments may generally include a pouch or receptacle composed of the films of the invention as described above. In some embodiments, the water pouch or receptacle may include a first sheet and a second sheet composed of the films of the invention. The first sheet may be joined to the second sheet to at least partially define a chamber containing a substrate. In some embodiments, the first sheet and second sheet may be contiguous on at least one edge of the chamber, thereby providing a folded edge.

Edges can be joined by various means. For example, in some embodiments, edges can be joined by heat sealing. In other embodiments, the edges can be joined using an adhesive. Examples of adhesives include, for example, gums, starches, gelatins, Arabic gum, tapioca starch, xanthan gum, and the like and combinations thereof.

In some embodiments, the first sheet and the second sheet may be composed of one or more layers of material. For example, in some embodiments, the first and second sheets may be composed of a single layer of the films of the invention. In other embodiments, the first and second sheets may be composed of two or more layers of the films of the invention. In such embodiments, each of the first and second layers of films may be composed of the same film or different films. For example, in some embodiments, each of the first and second sheets may be composed of a outer structural layer and a inner protective layer.

In some embodiments, multilayer sheets can be used to package liquids. In such embodiments, the inner protective layer may be composed of an impermeable material to segregate the liquid from a water soluble film. This inside coating should be sufficiently thin that it is not detectable when the pod is dissolved, and the outer structural layer may be sufficiently strong to maintain the integrity of the pod without protection by the inner coating from the packaged liquid. In some embodiments, the inner protective layer may include a hydrophobic material such as, for example, waxes, resins, oils, fatty acids, fats, lacquers, hydrophobic proteins, and the like and combinations thereof. Specific examples, the hydrophobic material may include, without limitation, corn zein, shellac, and beeswax.

In some embodiments, multilayer films can be prepared using substantially the same process as discussed above, with the addition of the step of coating at least one surface of the film with a hydrophobic material before curing the film. In other embodiments, multilayer films can be prepared using substantially the same process as discussed above, with the addition of the step of coating at least one surface of the film with a hydrophobic material after curing the film. Coating can be carried out by various means. For example, coating carried out by spraying, casting the inner layer separately and adhering the layers together, or casting the second layer directly on the film.

The length and the edges and size of the pouch or receptacle can vary among embodiments. For example, edges can each have a length up to about 100 mm, about 10 mm to about 100 mm, about 30 mm to about 90 mm, about 40 mm to about 80 mm, or any individual length or range encompassed by these example ranges. The plan view of the of the pouches or receptacles of the invention can be substantially rectangular, substantially square, substantially circular, elliptical, and the like or any other desired shape that is practical to manufacture. The overall plan area of the pouches and receptacles of the invention can be up to about 10,000 $mm^2$, about 5000 $mm^2$ to about 10,000 $mm^2$, about 7500 $mm^2$ to about 10,000 $mm^2$ or any range or individual area encompassed by these example ranges. Sized and dimensioned as such, the pouches and receptacles of the invention can fit conveniently within the grasp of an adult human hand.

Certain embodiments include methods for preparing pouches and receptacles composed of the films of the invention. Such methods may include contacting a first sheet of the films of the invention with a second sheet of the films of the invention, sealing at least one edge of the first and second sheets to form a pouch, filling the pouch, and sealing the remaining edges of the first and second sheets to form a pod. In some embodiments, the method may include folding a sheet of a film of the invention such that, at a surface of the sheet, at least a portion of the sheet contacts at least a portion of an opposing surface of the sheet to create a pouch, filling the pouch, and sealing the edges of the folded sheet to form a pod. Such embodiments may further include sealing at least one edge of the folded sheet before filling the pouch. In some embodiments, the pod may be sealed on all four sides, and in some embodiments, the pod may be sealed on three sides.

Sealing can be carried out by various means. For example, in some embodiments, sealing can be carried out by heating edges of the pod sufficiently to cause the edges of the pod to become joined. In other embodiments, sealing can be carried out by applying an adhesive to the edges and joining the edges to create a seal. Examples of adhesives include, for example, gums, starches, gelatins, Arabic gum, tapioca starch, xanthan gum, and the like and combinations thereof. In some embodiments, sealing can be carried out by applying a solvent to the edges of a sheet, applying heat and pressure at least the wet portions of the edges of the sheet causing a seal to form.

In some embodiments, a method of fabricating an edible packaging pod may include forming a first shell portion and a second shell portion using a single- or multi-layer water soluble packaging film as described above. The water-soluble packaging film may include an edible alginate derivative. In some embodiments, the water-soluble packaging film may include an edible plasticizer and/or an edible preservative. The first shell portion includes a first protruded segment and a first extension, and the second shell portion includes a second protruded segment and a second extension. The interior surfaces of the first and second protruded segments may have a concave shape forming a packaging compartment for a food product. The method may also include placing a food product in at least one of the first protruded segment of the first shell portion and the second protruded segment of the second shell portion. The method may further include applying a sealing means to connect the first extension of the first shell portion and the second extension of the second shell portion, such that the food product is sealed within a packaging compartment formed by the first protruded segment and the second protruded segment. The 3-side sealing method or the 4-side sealing method as described above may be used to seal the packaging pod. In an embodiment of the method where a single-layer packaging film is used, the method may further include coating a first interior surface of the first shell portion and a second interior surface of the second shell portion with a protective layer (e.g., a hydrophobic layer) that is inert and impermeable to the food product.

The pods of various embodiments can be filled with various compositions. For example, filling the pods may include introducing a pre-measured serving of the food product into the pouch before sealing. The foodstuff or food product may be any edible foodstuff such as a beverage, nutritional supplement, dessert, powdered food mixture, and the like. In some embodiments, the foodstuff may include the ingredients for preparing, for example, milkshakes, ice cream, sauces, gravies, sorbets, smoothies, brownies, cookies, cakes, dessert, smoothies, yogurt, drink mixes, and the like. Such ingredients may include any of a variety of sweetening agents, flavorings, acidity regulators, colorings, thickening agents, texture modifiers, and/or other additives.

In some embodiments, the foodstuff may be a powdered nutritional formulation, such as a powdered protein supplement, powdered milk, powdered baby food, or powdered infant formula.

In some embodiments, the films used in such pods may be textured as discussed above. For example, the films may include sufficient projections to produce a lotus effect providing the hydrophobic barrier to reduce or delay dissolution when the film is contacted with water. Surfaces of films containing such projections may make up an inner surface of the pods, producing a water-resistant barrier reducing or eliminating dissolution of the pod by liquid contents. In certain embodiments, the films used to make a pod may include multiple layers. For example, such films may include a structural layer and a protective layer. The protective layer may be inert and impermeable to the contents of the pod and protects the structural layer from the contents of the pod. In some embodiments, the protective layer may be attached to the structural layer through an adhesive layer interposed therebetween. In some embodiments, the structural layer may include textures on the surface facing the packaging content. Such textures on the structural layer give rise to a rough surface providing a strong adherence for the protective layer.

Texturing of both the bulk-film and of the inner coating can further optimize the film. By texturing the outside of the bulk film, the breaking apart of the packaging can be increased. Additionally and/or alternatively, logos can be imprinted for branding on the outside of the packaging pod and/or texturing can be used to impart nonstick properties to the outside of the packaging. By texturing the inside of the bulk film, a rough surface for the inner coating to adhere can be created, making the coupling of layers more robust. For the inner coating, textures have been shown to increase the hydrophobicity of surfaces. Thus, the inner coating can be textured to increase its hydrophobicity and allow for a thinner, less permeable barrier. Highly organized textured surfaces are achieved by altering the release film. The desired texture will be embedded onto the release film, so after the solution is cast and cured, it can be removed with the appropriate texture on the film. More random textures may be applied through abrasion and other mechanical and chemical stressors.

EXAMPLES

Although the present invention has been described in considerable detail with reference to certain preferred embodiments thereof, other versions are possible. Therefore, the spirit and scope of the appended claims should not be limited to the description and the preferred versions contained within this specification. Various aspects of the present invention will be illustrated with reference to the following non-limiting examples.

Example 1

A packaging solution made from sodium alginate was prepared. To make 110 square inches of film having a thickness of 0.17 inches, 5 g of sodium alginate, 300 g water, 43 g 70% ethanol 30% water, and 1.58 g glycerol were combined. First, the glycerol was mixed with water and heated to approximately 90° C. Separately, the sodium alginate was combined with the ethanol solution (as a dispersing solvent) and stirred into a slurry. Once adequately dispersed, the slurry was poured into the glycerol, water solution, stirred, and heated until the solutions were fully combined. This solution was then poured onto a 10 inch by 11-inch silicon tray and allowed to cure in ambient conditions. Once sufficiently dry, the film was removed from the tray.

Example 2

A packaging solution made from sodium alginate was prepared. To make 110 square inches of film having a thickness of 0.14 inches, 2.5 g of sodium alginate, 250 g water, 0.6 grams of soy lecithin, 2.5 grams of maltodextrin, 2 grams of sodium citrate, and 1.25 g glycerol were combined. First, all of the ingredients are combined in a high shear mixer. Once adequately mixed, the smooth viscous solution is transferred to a heating apparatus. The solution is heated to boiling to ensure all the ingredients are properly dissolved. This hot solution was then poured onto a 10 inch by 11 inch silicon tray and allowed to cure in ambient conditions. Once sufficiently dry, the film was removed from the tray.

Example 3

A packaging solution made from sodium alginate was prepared. A composition containing 21.96 wt. % sodium alginate, 4.79 wt. % soy lecithin, 19.96 wt. % maltodextrin, 15.97 wt. % sodium citrate, 25.33 wt. % glycerin, 5.99 wt. % erythritol, 5.99 wt. % xylitol, and water were combined in a high shear mixer. Once adequately mixed, the smooth viscous solution is transferred to a heating apparatus and heated to boiling to ensure all the ingredients are properly dissolved. This hot solution was then poured onto a silicon tray and allowed to cure in ambient conditions. Once sufficiently dry, the film was removed from the tray.

The invention claimed is:
1. A water-soluble packaging film comprising;
about 20 wt. % to about 50 wt. % biodegradable polymer,
about 5 wt. % to about 40 wt. % polyhydric alcohol, polyhydric acid, or combinations thereof,
4 wt. % to about 10 wt. % emulsifier, surfactant, or combination thereof;
about 5 wt % to about 25 wt. % chelating agent; wherein the chelating agent is selected from the group consisting of citric acid, a citric acid salt, a citric acid ester, gluconic acid, a gluconic acid salt, glucaric acid, a glucaric acid salt, tartaric acid, a tartaric acid salt, a phosphate salt, a diphosphate salt, a triphosphate salt, an organic phosphonate, nitrilotriacetic acid, polyaspartic acid, polyglutamic acid, hydrolyzed soy protein, phytic acid, sodium phayates, ethylenediamine tetraacetic acid, ethylenediamine-N,N'-bis(2-hydroxyphenylacetic acid), diethylenetriamine pentaacetate, glucoheptonate, polyamidoamine, polyethyleneamine, polyethyleneimine, polyethylenimine monoethanol ethylenediamine triacetic acid, diethanol ethylenediamine diacetic acid, diethylenatriamine pentacetic acid, monoethanol diethylenetriamine tetraacetic, N-hydroxyethyl diethylenetriamine tetraacetic, N'-hydroxyethyl diethylenetriamine tetraacetic, diethanol diethylenetriamine triacetic acid, N,N'-dihydroxyethyl diethylenetriamine triacetic acid, N',N"-dihydroxethyl diethylenetriamine triacetic acid, isopropylene, methylethylene, cyclohexvlene, or combinations thereof, and
about 15 wt. % to about 45 wt. % bulking agent selected from the group consisting of maltodextrin, tapioca starch, potato starch, corn starch, cellulose, pectins, glucans, mucilages, inulin, chitin, and combinations thereof;

wherein the wt. % is based on the total weight of the water-soluble packaging film.

2. The water-soluble packaging film of claim 1, wherein the biodegradable polymer is selected from the group consisting of polylactic acid (polylactide), chitin, chitosan, alginic acid, alginate salts, propylene glycol alginate, lignin, thermoplastic starch, polyethylene, polypropylene, polyethylene glycol, polyglycolide, poly (lactide-co-glycolide), polyacrylate, polymethacrylate, poly (8-caprolactone), polyorthoester, polyanhydride, polylysine, polyethyleneimine, carboxymethylcellulose, acetylated carboxymethylcellulose, gelatin, collagen, pullulan, cold-soluble gelatin, pectin, locust gum derivatives, kappa carrageenan, lambda carrageenan, iota carrageenan, and combinations or copolymers thereof.

3. The water-soluble packaging film of claim 1, wherein the biodegradable polymer is selected from the group consisting of alginate or alginate salt or combinations of alginate and alginate salts.

4. The water-soluble packaging film of claim 3, wherein the alginate salt is selected from the group consisting of sodium alginate, calcium alginate, magnesium alginate, potassium alginate, or combinations or mixtures thereof.

5. The water-soluble packaging film of claim 1, wherein film comprises the polyhydric alcohol, and the polyhydric alcohol is selected from the group consisting of glycerol, sorbitol, mannitol, galactitol, arabitol, erythritol, xylitol, and combinations or mixtures thereof.

6. The water-soluble packaging film of claim 1, wherein the polyhydric alcohol comprises any combination of glycerol, xylitol, and erythritol.

7. The water-soluble packaging film of claim 1, wherein the emulsifier or surfactant is selected from the group consisting of lecithin, sunflower lecithin, soy lecithin, monoglycerides, diglycerides, gums, guar gum, Arabic gum, locust bean gum, polysorbates, polysorbate-80, sucrose esters, and combinations thereof.

8. The water-soluble packaging film of claim 1, wherein the chelating agent is selected from the group consisting of sodium citrate, monosodium citrate, disodium citrate, trisodium citrate, sodium triphosphate (STPP), sodium hexametaphosphate, sodium phosphate, disodium phosphate, trisodium phosphate, and combinations thereof.

9. A package of an edible foodstuff comprising:
a water-soluble packaging film comprising:
about 20 wt. % to about 50 wt. % biodegradable polymer, about 5 wt. % to about 40 wt. % polyhydric alcohol, polyhydric acid, or combinations thereof;
4 wt. % to about 10 wt. % emulsifier, surfactant, or combination thereof;
about 5 wt. % to about 25 wt. % chelating agent: wherein the chelating agent is selected from the group consisting of citric acid, a citric acid salt, a citric acid ester, gluconic acid, a gluconic acid salt, glucaric acid, a glucaric acid salt, tartaric acid, a tartaric acid salt, a phosphate salt a diphosphate salt, a triphosphate salt, an organic phosphonate, nitrilotriacetic acid, polyaspartic acid, polyglutamic acid, hydrolyzed soy protein, phytic acid, sodium phayates, ethylenediamine tetraacetic acid, ethylenediamine-N, N'-bis(2-hydroxyphenylacetic acid), diethylenetriamine pentaacetate, glucoheptonate, polyamidoamine, polyethyleneamine, polyethyleneimine, polyethylenimine monoethanol ethylenediamine triacetic acid, diethanol ethylenediamine diacetic acid, diethylenatriamine pentacetic acid, monoethanol diethylenetriamine tetraacetic, N-hydroxyethyl diethylenetriamine tetraacetic, N'-hydroxyethyl diethylenetriamine tetraacetic, diethanol diethylenetriamine triacetic acid, N,N'-dihydroxyethyl diethylenetriamine triacetic acid, N',N''-dihydroxethyl diethylenetriamine triacetic acid, isopropylene, methylethylene, cyclohexylene, or combinations thereof, and
about 15 wt. % to about 45 wt. % bulking agent selected from the consisting of maltodextrin, tapioca starch, potato starch, corn starch, cellulose, pectins, glucans, mucilages, inulin, chitin, and combinations thereof,
wherein the wt. % is based on the total weight of the water-soluble packaging film;
wherein the water-soluble film is formed into a sealed package having enclosed therein a concentrated amount of a foodstuff.

10. The device of claim 9, wherein the foodstuff is selected from the group consisting of powdered nutritional formulation, powdered protein supplement, powdered milk, powdered baby food, powdered infant formula, and combinations thereof.

11. The water-soluble packaging film of claim 1, wherein the film has a thickness of 0.5 mil to 8 mil.

12. The water-soluble packaging film of claim 1, wherein the film is shaped as a pod or pouch.

13. The water-soluble packaging film of claim 1, wherein film comprises the polyhydric alcohol, and, when the film dissolves in water, the chelating agent is a salt or forms a salt in a dissolved state.

* * * * *

UNITED STATES PATENT AND TRADEMARK OFFICE
CERTIFICATE OF CORRECTION

PATENT NO. : 11,795,305 B2
APPLICATION NO. : 16/392704
DATED : October 24, 2023
INVENTOR(S) : Jared Richard Raszewski It is certified that error appears in the above-identified patent and that said Letters Patent is hereby corrected as shown below:

On the Title Page

Item (60) Column 1, Line 61, 'No. 62/611,845' should read --No. 62/661,845--

Signed and Sealed this
Sixth Day of August, 2024

Katherine Kelly Vidal
*Director of the United States Patent and Trademark Office*